June 7, 1949.  C. E. ELLSWORTH  2,472,472
LOADING TRAY
Filed April 22, 1946  2 Sheets-Sheet 1
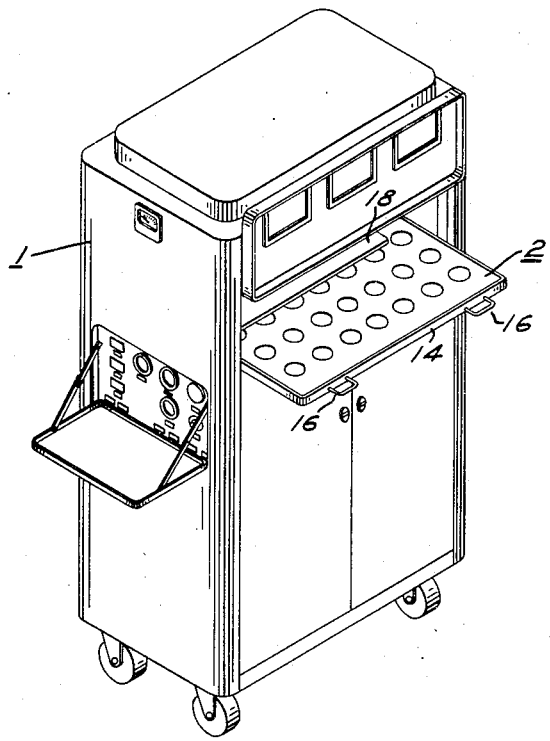
Fig.1.
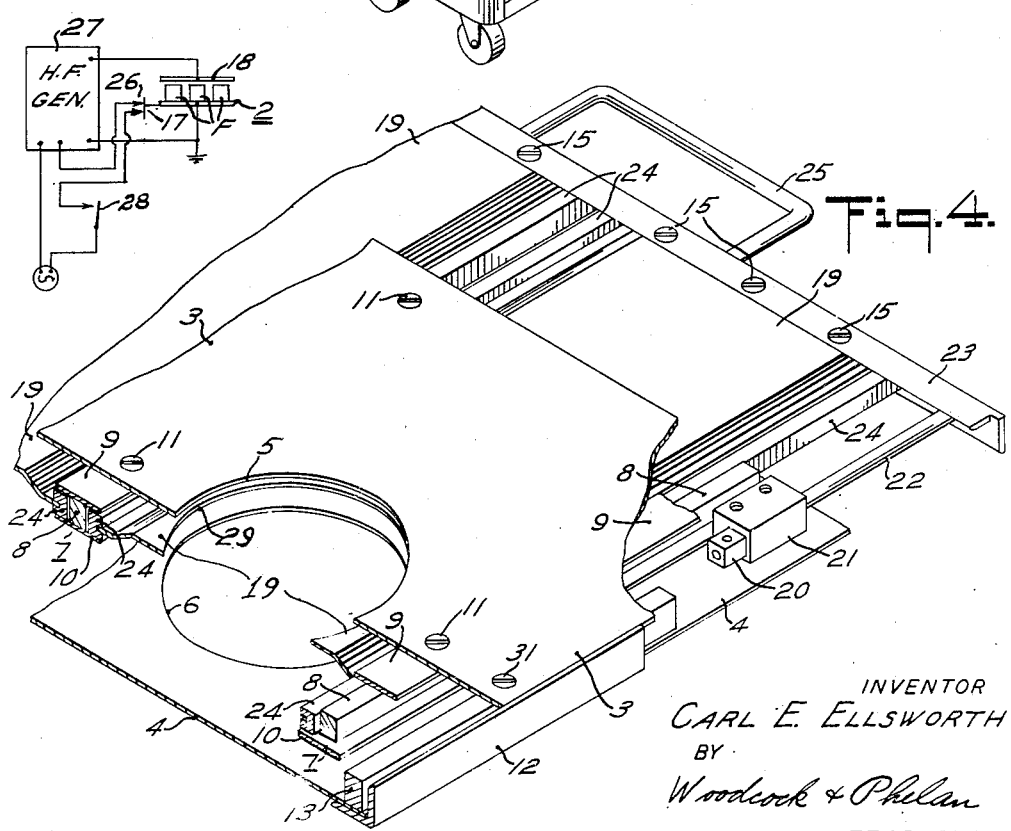
Fig.2.
Fig.4.
INVENTOR
CARL E. ELLSWORTH
BY
Woodcock & Phelan
ATTORNEYS

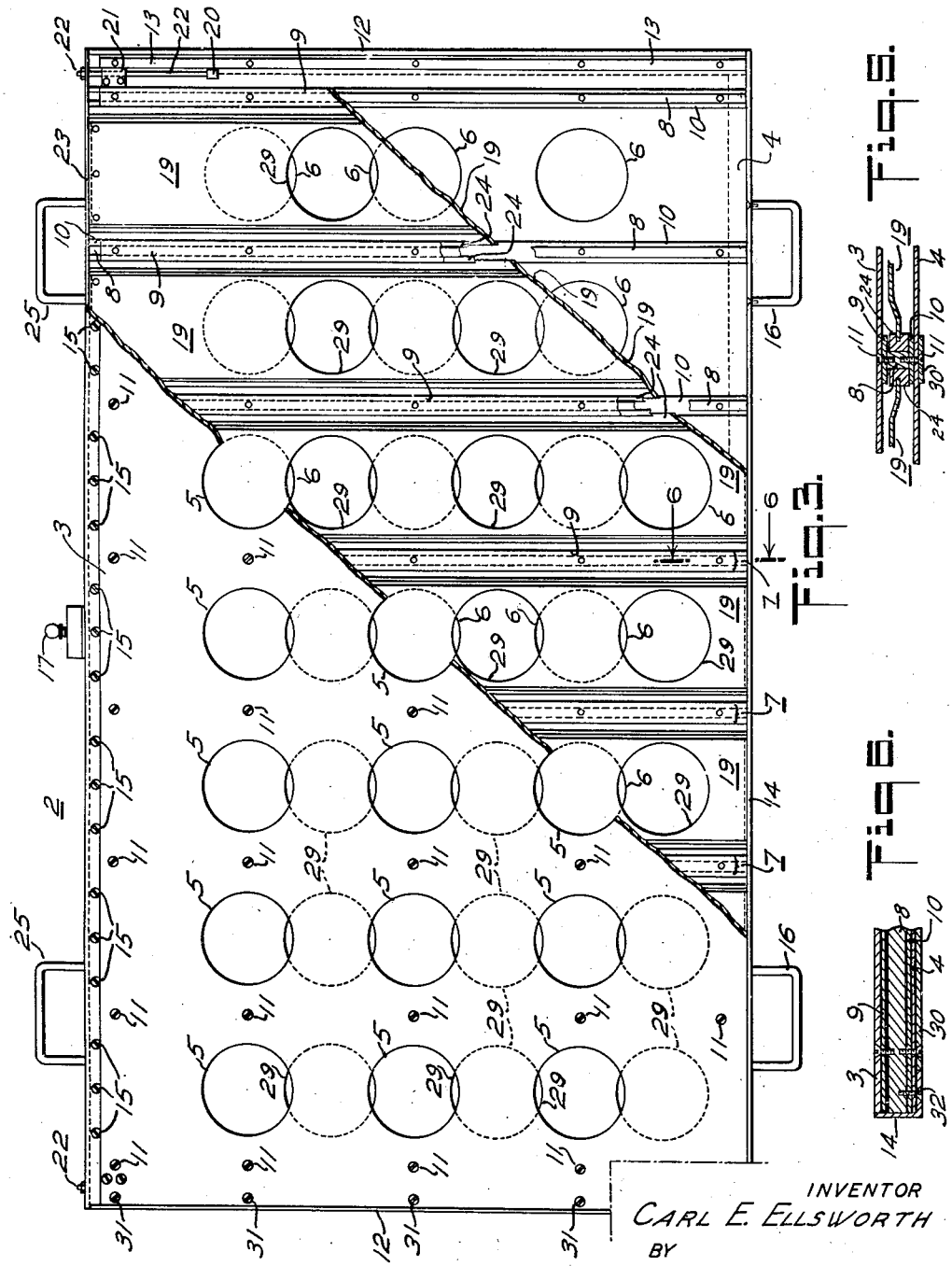

Patented June 7, 1949

2,472,472

UNITED STATES PATENT OFFICE 2,472,472

LOADING TRAY

Carl E. Ellsworth, Louisville, Ky., assignor to The Girdler Corporation, Louisville, Ky., a corporation of Delaware Application April 22, 1946, Serial No. 664,028

10 Claims. (Cl. 18—1)

My invention relates to the dielectric heating of objects in a high-frequency heating unit and particularly to the construction of a loading tray therefor which provides for simultaneous discharge of heated objects and, in reloading of the tray, facilitates placement and maintenance of the objects in proper spaced relation.

In accordance with my invention, the tray, which preferably serves as one of the heating electrodes, comprises relatively movable parallel plate members each having holes therethrough which may be moved into and out of alignment with the corresponding holes in the adjacent plate. The plates, when their openings are out of alignment, provide a support having shallow recesses to receive the objects to be heated. After heating of the objects and removal of the tray from the unit, the plates are relatively moved to bring the corresponding openings into alignment, so permitting the objects to pass through the tray. More specifically, the tray comprises top and bottom plates which are stiffened and joined by grooved members extending between adjacent rows of aligned openings in the plates and serving as guides for a group of interconnected plate structures, each having openings which may be moved into and out of alignment with the corresponding openings in the top and bottom plates.

My invention further resides in features of construction and arrangement hereinafter described and claimed. For a more detailed understanding of my invention and for illustration of a preferred form thereof, reference is made to the accompanying drawings, in which:

Fig. 1, in perspective, shows a high-frequency heating unit with the loading tray empty and partially withdrawn from the unit;

Fig. 2 diagrammatically illustrates the relation of the loaded tray to elements of the high-frequency unit;

Fig. 3 is a plan view, with parts broken away, of the loading tray shown in Fig. 1;

Fig. 4 is a detail view, in perspective and on enlarged scale, showing details of internal construction of the loading tray;

Fig. 5 is a detail view on enlarged scale showing plate interconnecting means and a tray runner; and Fig. 6 is a detail view in section taken on line 6—6 of Fig. 3.

Referring to Fig. 1, the heating unit 1 is of a type used to preheat, for example, plastic preforms or blanks to be molded in a press to form such articles as distributor heads for internal combustion engines. These preforms as received in the press should be evenly heated to proper molding temperature; if they are insufficiently heated great pressure is required to shape them and there is danger of breaking, deforming, or displacing from proper position metallic inserts molded into the preforms during their shaping in the press. If, on the other hand, the temperature is too great, the preforms prematurely begin to set, if they are of thermosetting plastic material, with much the same disastrous results.

A thermosetting material often used for such preforms is mineral-filled melamine resin of which it is characteristic that there is but slight difference between the softening point, the flow point, and the setting-up point. It is, therefore, necessary that after the preforms have been heated they be transferred as quickly as possible to the molding-press.

Furthermore, the preforms when heated to the proper temperature are of consistency similar to that of putty and should, therefore, be subjected to a minimum of handling.

As will hereinafter appear, the construction of the loading tray 2 is such that after a batch of preforms F, Fig. 2, have been heated and the tray withdrawn from the heating unit, all the preforms may be simultaneously released in proper position in a multiple press merely by pulling the opposite sides of the tray and then lifting it to clear the discharged batch.

As shown in Fig. 3, the tray 2 is formed by an upper plate 3 and a lower plate 4 having a series of rows of openings 5 and 6 respectively, each hole 5 in the top plate being in alignment with a corresponding hole 6 in the bottom plate. The diameter of the holes 5 and 6 is sufficiently large to pass the particular preforms for which the tray is to be used. The plates 3 and 4 are preferably thin sheets of aluminum or other suitable metal which are stiffened and joined by a series of reinforcing members 7, each extending crosswise of the sheets in the space between them and substantially midway between the adjacent rows of holes in the plates. Each of the reinforcing members 7 may be integrally of H cross-section or may be fabricated from, for example, a rectangular bar 8, Fig. 5, to the upper and lower sides of which are respectively attached the strips 9 and 10. The bars 8 and the strips 9 and 10 may be held in position to form an H-beam, Figs. 4 and 5, by screws 11 which pass through the upper and lower plates 3 and 4 and through the flange-forming strips 9 and 10, threadably to engage the web-forming bar 8.

To reduce the frictional resistance between the loading tray and its supporting structure in the heating unit 1 during its insertion into, and withdrawal from, the heating unit, two or more runners or straps 30 may be attached to the under side of the tray. For example, as shown in Fig. 5, a runner 30 extending crosswise of the bottom plate may be disposed opposite a reinforcing strip 10 for attachment by the same series of screws 11 used to hold the bottom sheet 4 against the strip 10. The ends of the tray may be closed, Fig. 3, by the angle pieces 12, 12 which also serve as runners. Each of the pieces 12 is secured to the under face of the bottom plate 4, as by screws which pass through the angle piece and the plate, threadably to engage the corresponding end-reinforcing bar 13. The top plate 3 is also secured to the reinforcing bars 13 by screws 31.

The front of the tray 2 is closed by the angle piece 14 secured to the under face of the bottom plate 4, as by screws 32 which pass through the angle piece, and the plate, threadably to engage the web-forming bars 8, Fig. 6. To this side of the tray, and preferably to the closure member 14, there are attached the metal handles 16 which are accessible to the operator for withdrawing the tray 2 and its load from the heating unit 1.

Beneath each series of openings 5 in the upper plate 3, there is slidable an elongated plate structure 19, preferably of sheet aluminum, in length substantially correspondinng to the width of the tray and having therein a series of openings 29 so located that when the plate structure 19 is pulled partially out of the tray to the position shown in Fig. 4, the openings 5, 29 and 6 are all in vertical alignment to permit the heated objects or preforms to slip through the tray. Retraction of the plate structure 19 beyond the position shown in Fig. 4 is precluded by engagement between the pairs of stop members 20 and 21, respectively attached to the movable plate structure 19 and to the main body of the tray formed by the plates 3, 4, and their interconnecting members 7. In the particular arrangement shown, each of the stop members 20 is secured to one end of a rod 22 which, at its other end, is attached to the member 23, itself interconnecting through screws 15 the several plate structures 19 so as to provide for their movement in unison toward and from the loading and unloading positions.

As clearly appears in Fig. 4, each of the plate structures 19 has a central raised portion which preferably only slightly clears the under face of the top sheet 3 so that essentially the entire mass of a preform, received in a shallow recess provided by an opening 5 and resting upon the plate structure 19 directly below it, is above the plane of the top plate. The plate structure 19 is bent downwardly and outwardly in opposite directions from the raised central portion to stiffen the plate structure longitudinally and to provide for attachment of the opposite edges of the plate, as by pinning, to the slotted stiffening and guiding bars 24, which are slidably received in the guiding grooves between the flanges of the H-members 7. To the rear slide member 23 which interconnects all of the plate structures 19 are attached the handles 25 which, together with the handles 16 fastened to the main body of the tray, provide a means for both lifting and carrying the tray, loaded or unloaded, to or from the dielectric heating unit 1. By pulling on both of the handles 25 and 16, Fig. 3, which is possible only when the tray 2 is out of the heating unit, all of the plates 19 are retracted, Fig. 4, for unloading of the tray. By pushing on the handles 25 and 16, all of the plates 19 are reinserted, Fig. 3, for support of another batch of preforms or other objects to be heated. When tray 2 is in the heating unit 1, the rear handles 25 of the tray are not accessible and they remain so until the tray is withdrawn, thus precluding accidental displacement of the preforms.

The main members of the tray are preferably of aluminum for lightness and good electrical conductivity. All members, including 30, 24, 8, 9, 10 and 12, which are subjected to sliding friction are of brass, copper-plated steel, or other material suited to withstand wear.

As shown in the simplified circuit diagram, Fig. 2, the power supply circuit of the high-frequency generator 27 of unit 1 includes the tray switch contacts 26 in series with a switch 28 used to start and stop operation of the generator. Unless the tray is in proper position, with the contacting member 17 on the rear edge thereof effecting closure of switch contacts 26, the high-frequency generator cannot be operated. The tray 2 must be inserted with the movable handles 25 leading the tray. The stationary or frame-secured handles 16 are positioned for withdrawal of the tray 2 from unit 1. Thus, the required force for insertion or withdrawal of the tray may be exerted without danger of discharging or dumping preforms with the tray in place in the unit 1.

The shallow recesses in the tray facilitate spacing of the objects between the electrodes 2 and 18 and reduce the chances of accidental displacement of the objects in normal handling of the tray in loading and unloading of the unit 1 and in loading a multiple-plunger press. They also insure that the preforms, as delivered in the tray to the press, are all in proper position so that merely by pulling the tray handles, all are at once discharged in readiness for the press operation. The rapidity with which all heated objects of a batch may be transferred by this tray from the heating unit to the press greatly minimizes the possibility of overheating of some or all preforms in effort to allow for longer time of transfer or of undesirable low temperature of at least some preforms because of excessive time lost in their transfer to the press. In addition, use of the tray results in reduced labor costs.

The tray being of metal having good electrical conductivity is not heated by its disposition in the electric field which heats the preforms or equivalent and may, therefore, be safely, easily and manually handled. The operator in withdrawing or reinserting the tray 2 is in no danger of electrical shock or high-frequency burn because although the tray is one of the electrodes, it is at ground potential.

It shall be understood the invention is not limited to the preferred embodiment shown but is subject to changes and modifications within the scope of the appended claims.

What I claim is:

1. A loading-tray electrode for a high-frequency heating unit comprising metal top and bottom plates having rows of aligned openings therethrough, members each between adjacent rows of said openings for joining said plates in spaced relation, a plurality of plate structures each slidable between said plates with its edges guided by an adjacent pair of said members and having openings movable into and out of alignment with said openings in the top and bottom plates for unloading and loading of the tray, and a member connecting the ends of said plate structures to effect their movement in unison to and from loading and unloading positions.

2. A loading-tray electrode for a high-frequency heating unit comprising thin metal top and bottom plates having rows of aligned openings therethrough, grooved reinforcing members joining said plates between adjacent rows of said openings, a plurality of metal plate structures each slidable between said plates with its edges received by the grooves of an adjacent pair of said reinforcing members and having openings movable into and out of alignment with the openings in said plates for unloading and loading of the tray, and a member interconnecting the ends of said plate structures to provide for their movement in unison to and from loading and unloading positions.

3. A loading-tray electrode for a high-frequency heating unit comprising thin metal top and bottom plates having rows of aligned openings therethrough, grooved reinforcing members joining said plates between adjacent rows of openings, a plurality of metal plate structures each slidable between said plates and having a row of openings movable into and out of alignment with the openings of the corresponding rows in said plates for unloading and loading, pairs of stiffening and guiding bars, each pair stiffening the opposite edges of one of said plate structures and received by the grooves of an adjacent pair of said reinforcing members, and a member interconnecting the ends of said plate structures to provide for their movement in unison to and from loading and unloading positions.

4. A loading-tray electrode for a high-frequency heating unit comprising thin metal top and bottom plates having rows of aligned openings therethrough, reinforcing members each between adjacent rows of said openings for maintaining said plates in spaced relation, runners extending along the under surface of said bottom plate, fastening means for said runners each passing through said bottom plate and into one of said reinforcing members, a plurality of plate structures each slidable between said plates and guided by an adjacent pair of said members and having openings movable into and out of alignment with a row of said aligned openings in the top and bottom plates for loading and unloading of the tray, and a member connecting the ends of said plate structures to effect their movement in unison to and from loading and unloading positions.

5. A loading-tray electrode for a high-frequency heating unit comprising spaced rectangular top and bottom plates having rows of aligned openings therethrough, means for closing the front and side edges of the tray and interconnecting said plates, reinforcing members extending from front to rear of the tray each between adjacent rows of said openings and attached to said plates, a plurality of plate structures each slidable between said plates, guided by an adjacent pair of said members, and having openings movable into and out of alignment with the corresponding row of said aligned openings for unloading and loading of the tray, and a member interconnecting the movable plate structures at the rear of the tray to effect their movement in unison to and from loading and unloading positions and to close the rear edge of the tray when they are in loading position.

6. A loading-tray electrode for a high-frequency heating unit comprising spaced rectangular top and bottom plates having rows of aligned openings therethrough, means including angle pieces which close the front and side edges of the tray for holding said plates in spaced relation, grooved reinforcing members extending from front to rear of the tray each attached to said plates between adjacent rows of said openings, a plurality of intermediate plate structures each with its sides slidably guided by an adjacent pair of said grooved members and having a row of openings movable into and out of alignment with the corresponding row in the top and bottom plates, and a member movable to close the rear edge of the tray and there interconnecting said plate structures to effect their movement in unison to and from loading and unloading positions.

7. A loading tray comprising top and bottom plates having rows of aligned openings therethrough, grooved reinforcing members each between adjacent rows of said openings for joining said plates in spaced relation, a plurality of intermediate plate structures each having a row of openings movable into and out of alignment with a row of said aligned openings and each bent downwardly and outwardly along opposite edges, pairs of stiffening and guiding bars, each pair stiffening said opposite edges of one of said plate structures and received by the grooves of an adjacent pair of said reinforcing members, and a member interconnecting the corresponding ends of said plate structures to provide for their movement in unison toward and from loading and unloading positions.

8. A loading-tray electrode for a high-frequency heating unit comprising top and bottom plates of metal having light weight and high electrical conductivity having rows of aligned openings therethrough, grooved reinforcing members each between adjacent rows of said openings for joining said plates in spaced relation and each of metal having high rigidity and good surface wearing quality, a plurality of plate structures each slidable between said plates and having a row of openings movable into alignment with a corresponding row of openings in the plates, said plate structures each being of light-weight metal, pairs of stiffening and guiding bars, each pair stiffening the opposite edges of one of said plate structures and received by the grooves of an adjacent pair of said reinforcing members, said bars each being of metal having high rigidity and good surface wearing quality, and a member interconnecting the ends of said plate structures to provide for their movement in unison to and from loading and unloading positions, said last-named member being of metal having high rigidity.

9. For use with a high-frequency heating unit, a portable loading tray electrode removable therefrom for loading and unloading of dielectric objects to be heated and comprising an upper plate having openings therethrough to receive and space said objects, a lower plate slidable with respect to said upper plate and having openings therethrough, which when aligned with the openings of the upper plate provide for discharge of said objects, said lower plate frictionally engaging said unit during insertion into and withdrawal of the tray from said unit and being slightly spaced from said upper plate to provide, upon misalignment of the openings of said plates, shallow recesses precluding accidental displacement of said objects in handling of the tray, and handle means connected respectively to the front end of said lower plate and to the rear end of said upper plate for accessibility of only one of them when the tray is in said unit in avoidance of accidental displacement of said objects and for accessibility of both of them when the tray is out of said unit for handling of the tray and for effecting relative sliding movements of said plates in loading and unloading of the tray.

10. For use with a high-frequency heating unit, a portable loading tray electrode removable therefrom for loading and unloading of dielectric objects to be heated and comprising an upper plate having openings therethrough to receive and space said objects, a lower plate slidable with respect to said upper plate and having openings therethrough, which when aligned with the openings of the upper plate provide for discharge of said objects, said lower plate frictionally engaging said unit during insertion into and withdrawal of the tray from said unit and being slightly spaced from said upper plate to provide, upon misalignment of the openings of said plates, shallow recesses precluding accidental displacement of said objects in handling of the tray, handle means connected respectively to the front end of said lower plate and to the rear end of said upper plate for accessibility of only one of them when the tray is in said unit in avoidance of accidental displacement of said objects and for accessibility of both of them when the tray is out of said unit for handling of the tray and for effecting relative sliding movements of said plates in loading and unloading of the tray, and a switch member mechanically connected to said upper plate for permitting operation of said heating unit only when said tray is so inserted therein that the handle connected to the lower plate is accessible externally of said unit.

CARL E. ELLSWORTH.

REFERENCES CITED

The following references are of record in the file of this patent:

UNITED STATES PATENTS

| Number | Name | Date |
| --- | --- | --- |
| 767,872 | Davies | Aug. 16, 1904 |
| 1,742,670 | Schmidt | Jan. 7, 1930 |
| 2,365,849 | Strauss | Dec. 26, 1944 |

OTHER REFERENCES

Rahm: Plastic Molding, published in 1933 by the McGraw-Hill Book Co. of N. Y., pages 196 and 197. Copy in Div. 15.

Thermis, a circular published by the Girdler Corp. of Louisville, Ky., Aug. 21, 1944. Copy in Div. 15, Elec. Heat Dig.